United States Patent [19]

Tedesco et al.

[11] Patent Number: 5,285,056

[45] Date of Patent: Feb. 8, 1994

[54] BAR CODE REFLECTANCE MEASUREMENT APPARATUS

[75] Inventors: Jack Tedesco, Manhattan Beach; Donald R. Palmer, Fontana, both of Calif.

[73] Assignee: RJS, Inc., Los Angeles, Calif.

[21] Appl. No.: 899,747

[22] Filed: Jun. 17, 1992

[51] Int. Cl.$^5$ .............................................. G06K 7/10
[52] U.S. Cl. ...................... 235/472; 235/455; 235/438; 235/485
[58] Field of Search ............. 235/472, 462, 455, 485, 235/464, 438, 439; 354/293, 295; 382/59

[56] References Cited

U.S. PATENT DOCUMENTS

| | | | |
|---|---|---|---|
| 4,107,540 | 8/1978 | Hillman | 235/472 |
| 4,210,802 | 7/1980 | Sakai | 235/483 |
| 4,222,654 | 9/1980 | Bodenhamer | 354/293 |
| 4,431,912 | 2/1984 | Dickson et al. | 235/462 |
| 4,672,215 | 6/1987 | Howard | 235/472 |
| 5,132,523 | 7/1992 | Bassett | 235/462 |

FOREIGN PATENT DOCUMENTS 0153482  11/1981  Japan ..................... 235/472

OTHER PUBLICATIONS

IBM Technical Disclosure Bulletin, vol. 20 No. 10 Mar. 1978, p. 4043.

*Primary Examiner*—Donald Hajec
*Assistant Examiner*—Esther Chin
*Attorney, Agent, or Firm*—Arthur Freilich; Robert D. Hornbaker; Leon D. Rosen

[57] ABSTRACT

Apparatus is described for use with a bar code scanner, to enable consistent bar code reflectance quality measurements. The apparatus includes a holder (60, FIG. 1) which holds a hand-held bar code scanner (20) at a predetermined distance (B) and angle (A) with respect to the surface of a sheet (12) that has been imprinted with a bar code. The holder has a lower end (66) for lying "flat" against the sheet, and has a plurality of switches (81-83, FIG. 3) at locations spaced around the lower end of the holder. Only when all switches are operated, is the lower end of the holder flat against the sheet, and only when all switches are simultaneously actuated is the bar code scanner operated to generate a display that indicates reflectance quality.

9 Claims, 3 Drawing Sheets

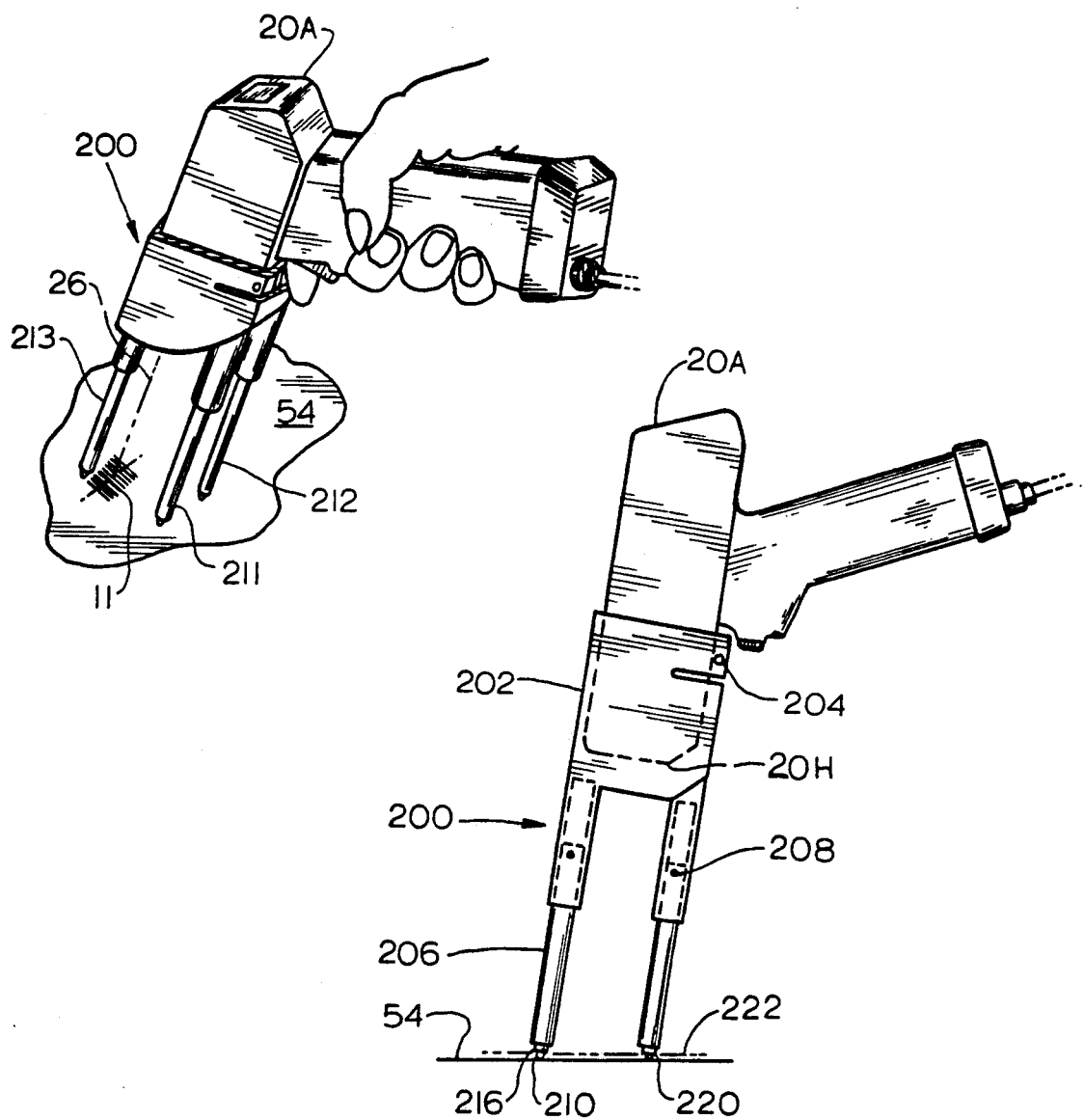

BAR CODE REFLECTANCE MEASUREMENT APPARATUS

BACKGROUND OF THE INVENTION

Companies that print and/or receive bar code labels often require apparatus for indicating whether the label will be accurately read by a large proportion of bar code scanners. A major factor determining whether the bar code label will be accurately read, is whether there is a sufficient difference in reflectance between the dark bars (usually created by applying ink to a light-colored surface) and the light bars (usually the portion of the original light-colored surface lying between the dark bars). Although a visual inspection of the label is useful, it is also useful to determine how well a bar code scanner or bar code label verifier can read the label. A bar code scanner often produces a display indicating the number read, while a verifier may indicate the number of times the same bar code number was detected, the amount of light detected at each of numerous points along the bar code label, etc. Applicant finds that the relative reflectance of the dark and light bars depends to a large extent upon the precise angle of the scanner or verifier with respect to the plane of the sheet on which the bar code has been printed. A change of angle of only a few degrees can result in a great difference in sensed reflectance. A device which could be used with a hand-held scanner (or verifier which can be considered to act as a scanner herein) would facilitate accurate measurement or determination of the reflectance characteristics of a printed bar code label.

SUMMARY OF THE INVENTION

In accordance with one embodiment of the present invention, an apparatus is provided which can be used with a hand-held scanner device (scanner or verifier) to enable consistent measurements of the quality of a bar code label. The apparatus includes a holder with an upper portion on which a hand-held scanner device can be mounted, and a lower end which is designed to lie "flat" against a surface on which a bar code has been marked. The holder includes a plurality of contact sensing devices spaced about the lower end of the holder, that each senses substantial contact of a corresponding location on the lower end of the holder with the surface containing the bar code. A circuit is connected to the plurality of contact sensing devices, and is constructed to operate the bar code scanner to produce a display (as in the form of a print out, characters on a liquid crystal display panel, or like record) only when all of the plurality of sensing devices sense substantial contact with the surface. Contact at all of the plurality of locations indicates that the holder and therefor the scanner device are at a predetermined angle with respect to the surface, to assure consistent measurements.

The holder can hold the scanner head at a plurality of different distances from the holder lower end, and therefor from the surface. This enables taking account of the fact that different scanners read optimally at different scanning distances from a bar code label, and to enable optimum reading of labels with different size bar code elements. The plurality of contact sensing devices can include three switches or, where the width of the lower end is greater than the depth, can include only two switches.

The novel features of the invention are set forth with particularity in the appended claims. The invention will be best understood from the following description when read in conjunction with the accompanying drawings.

BRIEF DESCRIPTION OF THE DRAWINGS

FIG. 9 is an isometric view of a holder constructed in accordance with another embodiment of the invention.

FIG. 10 is a side elevation view of the holder of FIG. 9.

DESCRIPTION OF THE PREFERRED EMBODIMENTS

Figure 1:
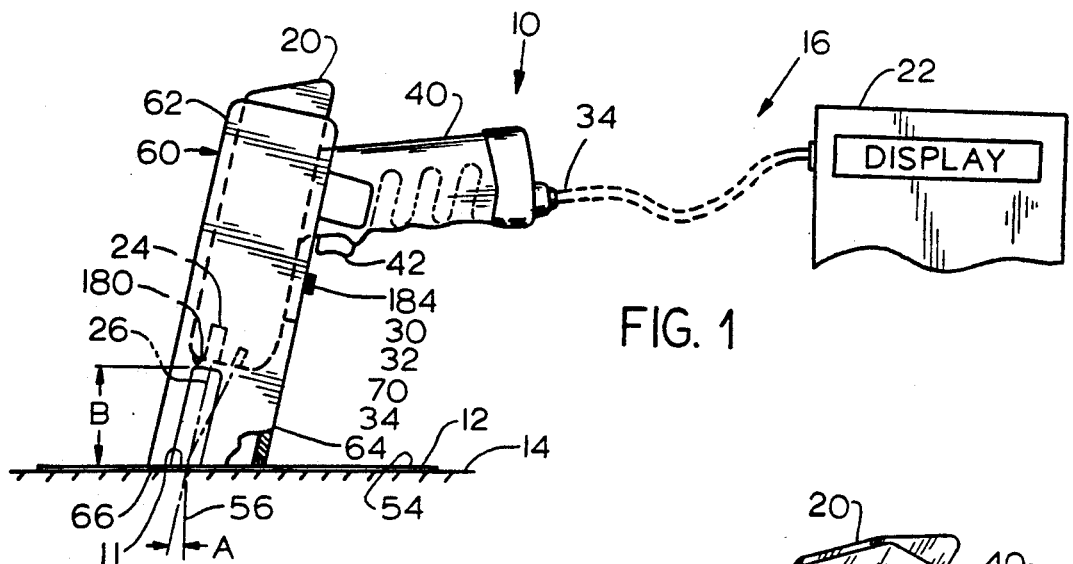
FIG. 1 is a side elevation view of a bar code measuring apparatus which includes a holder constructed in accordance with the present invention, shown holding a prior art scanner.

FIG. 1 illustrates a bar code measuring apparatus 10 for measuring the quality of a bar code 11 marked on a sheet 12 resting on the upper surface of a table 14 or the like. The measuring apparatus includes a scanner apparatus 16 that comprises a prior-art scanner 20 and a display device 22. The scanner 20 is of the type which has a scanning beam source indicated at 24 which directs a scanning beam 26 at the bar code 11 on the sheet. The scanner also includes a photo sensing arrangement 30 which senses reflected light passing along a reflection path 32 from the bar code. The beam 26 and reflection 32 pass along an optical path 34 extending from the beam scanner 24 to the bar code and then to the photo sensor arrangement 30. The output of the photo sensor arrangement 30 is delivered over a cable 34 to the display device 22, which may be a liquid crystal display, printer, etc.

The scanner 20 includes a pistol grip 40 which is held in the hand of a person who pulls a trigger 42 to operate the scanner. The scanner can be used to read out the number on the bar code. The scanner also can be used at a facility that prints bar code labels, to determine the "quality" of the label, that is, the likelihood that the label will be accurately read by a bar code scanner. Where the label is printed on cardboard or other less than ideal material, or has fine lines and is printed with only moderate care, there is a possibility that the label will be of poor quality and therefore sometimes may not be accurately readable by available scanners.

Figure 2:
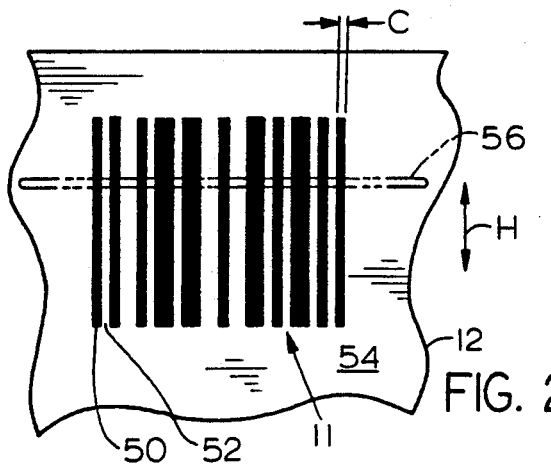
FIG. 2 is a plan view of a sheet with a surface bearing a bar code.

FIG. 2 illustrates the bar code 11 which includes dark bars or elements such as element 50, and light elements indicated by element 52 which is formed by the space between the dark elements. Usually, the dark elements such as 50 are printed on the surface 54 of the sheet and the light elements represent the surface of the unmarked sheet. The bar code generally has elements of different widths, with the elements 50, 52 being elements of minimum width. The ability of a bar code to be read depends largely upon the difference in reflectivity of the dark and light elements. For example, the light elements such as 52 may have a reflectivity of 82% of a particular color of light such as green, while the dark elements such as 50 may have a reflectivity such as 2% of that light. The 80% difference in reflectivity of the element generally results in a high probability of accurate reading of the bar code. The area 56 represents a scanning beam path. A quality check of a scan path of the bar code can include measuring the difference in reflectivity of the bars and spaces (or light bars) of that scan path. To determine the reflectance characteristics of a bar code, a person first places the apparatus in a condition to perform such measurement. The apparatus will have been calibrated by scanning a "standard" bar arrangement to serve as a reference. The reflectance measurement portion of the analysis obtained during scanning of the bar code that was analyzed, can be a read out in the form of a number representing the average or minimum difference in reflectivity of the dark and light elements for one bar code, or the reflectivity of the average or most reflective dark element and the reflectivity of the average or least reflective light element for one bar code, etc.

In one example, the readout is "80%", meaning that the difference in reflectivity between the average light element and average dark element was 80% of the difference between a 100% reflective and 0% reflective surface.

The measured reflectivity of the light and dark bar code elements depends to a large extent upon the exact angle A between the direction of the scanning beam 26 with respect to an imaginary line 56 extending normal to the surface 54 of the sheet containing the bar code. It also depends upon the distance B between the front or bottom of the scanner and the surface. If the angle A changes by only a few degrees, the quality measurement of the mark may change considerably. In order to enable consistent quality measurements, it is important that the scanner be held at a consistent angle and distance from the bar code being read.

Figure 3:
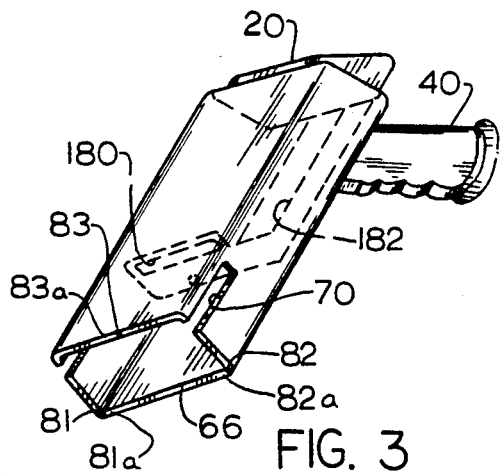
FIG. 3 is an isometric view of a portion of the apparatus of FIG. 1.
Figure 4:
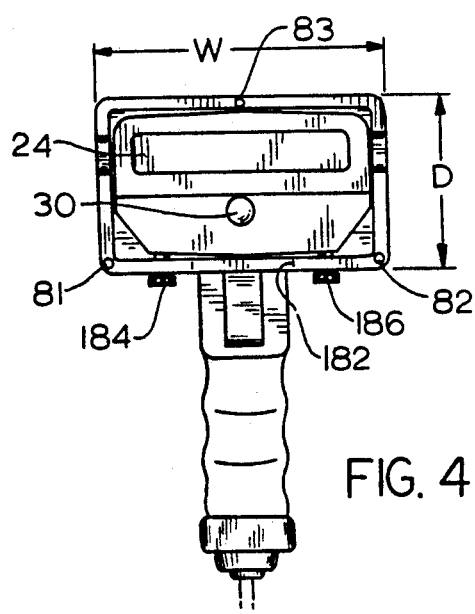
FIG. 4 is a bottom view of the apparatus of FIG. 3.

In accordance with the present invention, a holder 60 is provided, which has an upper portion 62 that holds to the normally hand-held scanner 20 and a lower portion 64 with a lower end 66 that rests on the surface 54 containing the bar code. A slot 70 is provided to enable the person to see where, along the height of the bar code, the beam is scanning. As shown in FIG. 3, the holder has three contact sensing devices 81-83 lying at locations 81a-83a spaced about the lower end 66 of the holder. The holder senses when its lower end 66 lies "flat" against the sheet, by detecting when all three sensing devices 81-83 engage the sheet. Only then does the scanner lie at a predetermined angle A with the sheet, the angle A in the example shown being 15° (the beam 26 extends 15° from the vertical when the sheet surface 54 is horizontal).

Figure 5:
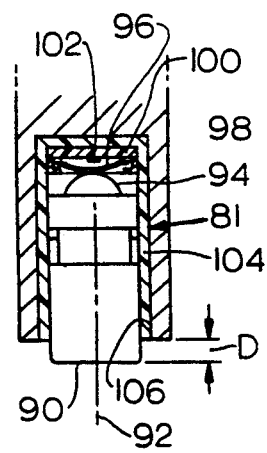
FIG. 5 is an enlarged sectional view of a portion of the holder of FIG. 3.

FIG. 5 illustrates one contact sensing device 81, which is in the form of a switch. The switch 81 includes an actuator 90 that slides along the axis 92, and which has a rounded upper end 94. The upper end 94 engages a dome-shaped contact 96 whose periphery lies on a conductive trace 98 of a circuit board 100. When the actuator 90 moves upwardly along the axis 92, the middle of the dome 96 is deflected upwardly until it engages another circuit board trace 102 to close the switch. The switch components are contained in a housing 104 that can be installed in a small hole 106 in the lower end of the holder. The above type of switch is known in the art, and can be constructed at low cost to a small size.

Figure 6:
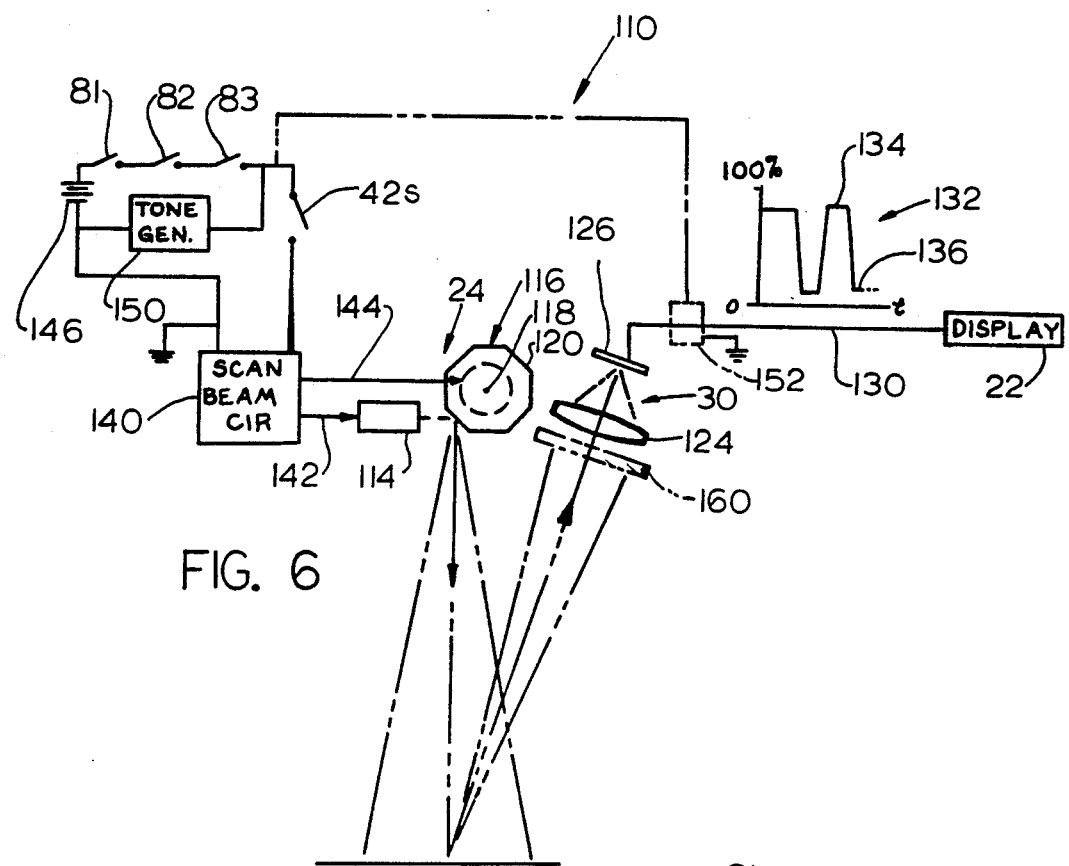
FIG. 6 is a schematic diagram of an electrical circuit of the apparatus of FIG. 1.

FIG. 6 is a circuit diagram 110 of circuitry which is connected to the switches 81-83 and which allows operation of the bar code scanner apparatus only when all three switches are closed to indicate that the scanner is at the proper angle to the surface containing the bar code, and is at the proper distance. The scanner can include a scanning beam source 24 which includes a laser 114 whose beam is reflected from a multi-sided mirror 116 that is rotated about an axis 118 by a motor 120. The rotating mirror causes the beam to scan from side to side. The photo sensor arrangement 30 includes a lens 124 that forms an image of the point of light on the bar code 11 onto a photo detector 126. The output of the photo detector is delivered over a conductor, or line 130 to the display 22. The output on line 130 is indicated by graph 132 which shows the variation of reflectance R with time T. The high points such as 134 on the graph represent the beam near the center of a light bar, while the low points such as 136 represent the beam near the center of a dark bar. The display 22 can indicate the number of times the correct bar code number has been read as the beam is moved along the height of the bar code, the reflectance of the dark bars and of the light bars, etc. The display can comprise a printout, numbers on a liquid crystal display device, etc.

A scan beam circuit 140 can be energized to deliver signals over lines 142, 144 respectfully to the laser 114 to energize it and to the motor 120 to rotate the mirror 116. The circuit 140 is energized by an electricity source 146 through a series connection of the three contact sensing switches 81-83 and a trigger switch 42s operated by pulling the trigger 42 on the scanner. The scan beam circuit 140 is energized only when all of the switches 81-83 and 42s are closed. Thus, no beam is directed toward the bar code and scanned across it, unless all three switches 81-83 are closed when the person pulls the trigger 42 on the scanner. This prevents the generation of any significant record on the display 22, unless the lower end of the holder lies "flat" against the paper, since it is only then that all three switches 81-83 are closed. Applicant also provides a tone generator 150 which emits a tone when all three switches 81-83 are simultaneously closed, to indicate to the person that the holder has been properly placed on the sheet.

A variety of other approaches can be used to prevent the generation of an erroneous display when all three switches 81-83 are not simultaneously closed. FIG. 6 shows, in phantom lines, a gate 152 which can be placed in series with the output line 130 of the photo detector 126, the gate 152 closing only when all three switches 81-83 are simultaneously closed, to only then allow signals to pass to the display 22. It is also possible to prevent operation of the display 22.

Figure 7:
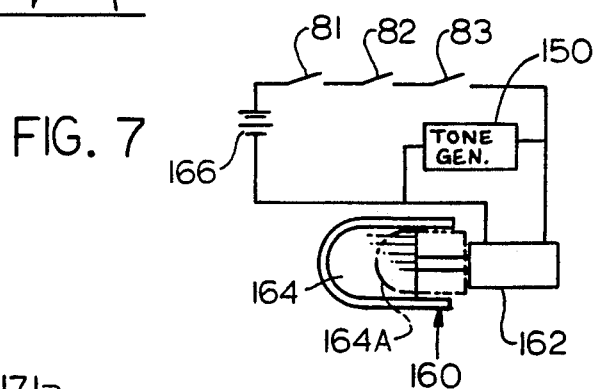
FIG. 7 is a circuit diagram of a display blocking mechanism constructed in accordance with another embodiment of the invention.

The above circuitry requires connection between the switches 81-83 and the circuitry of (or connected to) the scanner apparatus. Connection can be avoided by the use of a shutter 160 which is placed along the optical path 34 of light moving from the laser 114 to the mirror, along the path of the beam 26, and along the reflection path 32. A particular shutter 160 shown lies in front of the lens 124 which directs reflected light onto the photo detector 126. As shown in FIG. 7, the shutter 160 includes a solenoid 162 which, when energized, pulls a shutter member 164 (against the force of a spring, not shown) to the position 164A to unblock the path of the reflected beam moving towards the photo detector. The switches 81-83 are in series with an electrical source 166, to energize the solenoid 162 whenever all three switches 81-83 are simultaneously closed. The tone generator 150 is connected to provide a tone indicating that all three switches have been closed. As mentioned above, the advantage of this arrangement is that it does not require an electrical connection between the holder and scanner, although it requires a small electrical source such as a small battery on the holder. Other shutters can be used such as liquid crystal displays that pass light only when energized, or only when deenergized, etc. A latch can be used to enable manual opening of the shutter, or to keep the shutter open after it has been opened and until the scanner trigger is released or until a predetermined period such as a minute has elapsed. This allows other measurements to be made with the scanner while the holder is mounted thereon.

Figure 8:
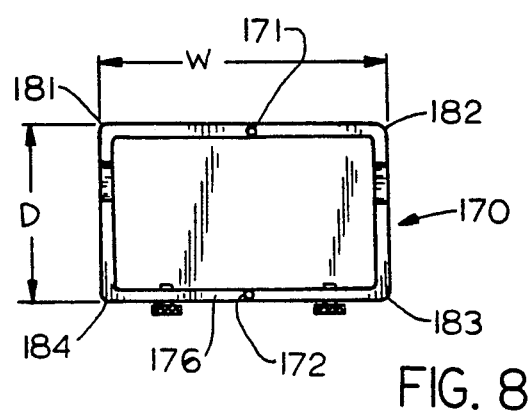
FIG. 8 is a bottom view of a holder constructed in accordance with another embodiment of the invention.

FIG. 8 illustrates a holder 170 that is similar to that of FIGS. 1-7, except that the holder 170 includes only two contact sensing devices 171, 172, and therefore does not block ambient light. However, the lower end 176 of the holder has a greater width W (at least 50% greater) than its depth D and the contact devices 171, 172 are spaced apart by most of the width W. This construction results in the holder end 176 having four locations 181-184 that can simultaneously contact the sheet. A person who is careful can be sure that the opposite sides spaced by the distance W rest on the sheet, so that tilting is only likely to occur which would raise one of the contact sensors 171, 172 above the sheet. Only if both contact sensors 171, 172 detect contact, will the scanner apparatus print or otherwise display a reflectance-indicating measurement.

The holders of FIGS. 1-8 allow the scanner 20 to be slid along the holder so that the lower end 180 of the scanner can be placed at different distances from the sheet containing the bar code to be scanned. The holder has a slot 182 (FIG. 3) along which the pistol grip or handle 40 can slide, and has a pair of thumb screws 184, 186 that serve as fixing means to fix the position of the scanner along the holder.

FIGS. 9 and 10 illustrate another holder 200 which has an upper portion 202 with a screw 204 for clamping around the lower portion of the scanner 20. The lower portion 206 of the holder is in the form of three rods which are each slidably received in a corresponding hole of the upper portion, and which are each clamped in position by a separate set screw 208. Contact sensors 210 such as switches, lie at the lower ends of each of the three rods 211-213 of the holder lower portion. The rods can be slid to change the angle of the scanner head end 20H with respect to the paper being scanned and/or the distance between the head end and the sheet surface 54. The lower end 216 of the holder has three locations 220 that lie on an imaginary plane 222 that lies substantial coplanar with the sheet surface 54.

While simple switches are probably the simplest types of contact sensors, it should be understood that a variety of different types are available such as types that rely on stoppage of air emission, optical sensing, etc. Although applicant has used terms such as "upper", "lower", etc., to aid in describing the invention as illustrated, it should be understood that the scanner and holder can be used in a variety of orientations with respect to gravity.

Thus, the invention provides apparatus for use with an operable hand-held bar code scanner, which provides consistent results when such scanner is used to provide an accurate reflectance measurement of a bar code. The apparatus includes a holder which mounts on the scanner and which has a lower end for lying against a sheet containing the bar code. The lower end has a plurality of contact sensors such as switches, which sense when each of a plurality of locations at the lower end of the holder lie substantially against the sheet. Only when all of the contact sensors sense contact, is a reading taken which indicates the reflectance of the bar code.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. Apparatus for use with an operable hand-held bar code scanner arrangement that includes a hand-held scanner which, when operated, directs a scanning beam at a bar code and detects reflected light and enables said arrangement to provide a measurement, for testing reflectance of a marked surface region of a sheet, comprising:

a holder which has an upper portion for holding said scanner and a lower portion with a lower end for resting on said sheet, said lower portion having a plurality of contact sensing devices each lying at a location of said lower end, with said locations spaced about said lower end, each contact sensing device constructed to sense substantial contact of a corresponding one of said lower end locations with said surface;

a circuit connected to said plurality of contact sensing devices and constructed to enable operation of said bar code scanner apparatus to provide a reflection measurement, only when all of said plurality of sensing devices sense substantial contact.

2. The apparatus described in claim 1 wherein:

said surface lies on an imaginary plane and said holder lower end has three locations lying substantially coplanar with said imaginary plane of said sheet;

said plurality of contact sensing devices comprises three switches each lying at one of said locations and having a switch actuator initially extending slightly below a corresponding one of said lower end locations.

3. The apparatus described in claim 1 wherein:

said holder lower end has a perpendicular horizontal width and depth dimensions with at least four of said locations spaced about said lower end for substantially engaging said surface to resist tilt when said four locations all lie substantially against said surface;

said four locations include first, second, third and fourth locations, said first and second locations being spaced by substantially said width dimension, said third and fourth locations being spaced apart by substantially said width dimensions, said first and third locations being spaced a part by substantially said depth dimension, and said second and fourth locations being spaced apart by substantially said depth dimension;

said width dimension is greater than said depth dimension, and said plurality of contact sensing devices includes first and second devices spaced apart by substantially said depth dimension, with said first device lying substantially between said first and third locations, and said second device lying substantially between said second and fourth locations.

4. The apparatus described in claim 1 wherein:
said holder is adjustable in position largely vertically with respect to said scanner, to move said scanner closer or further from said sheet surface, to enable effective scanning of bar codes with different minimum bar element widths, and said holder has means for fixing the position of said holder with respect to said scanner at any of a plurality of different positions of said scanner on said holder.

5. The apparatus described in claim 1 wherein:
light from said scanner passes along an optical path extending along the path of said beam and along the path of light reflected from said bar code that moves back toward said scanner to be detected;
said circuit includes a shutter device the blocks the passage of beam light along said optical path, except when all of said contact sensing devices sense substantial contact.

6. Apparatus for generating an indication of the light-reflecting contrast of light and dark bar code elements on a surface of a device which bears a bar code forming said bar code elements, comprising:
a bar code scanner apparatus that includes a hand held scanner having a head end with a mechanism that directs light in the form of a scanning beam generally downwardly toward said surface bearing a bar code while sweeping the beam from side to side and detecting portions of said beam which are reflected from the bar code;
said scanner apparatus including a device which creates a display of a quantity indicative of the light-reflecting contrast of the light and dark bar code elements;
a holder which has an upper portion that attaches to said scanner and a lower portion with a lower end for resting against said surface,
said holder having a plurality of actuatable contact switches spaced about said lower end and positioned so all of said switches are simultaneously actuated only when said lower end lies at a predetermined flat orientation against said surface;
a circuit coupled to said contact switches and to said scanner apparatus, which blocks the creation of said display when not all of said plurality of switches are actuated.

7. The apparatus described in claim 6 wherein:
said light directed by said mechanism passes along an optical path, along which said scanning beam and detected portions of said beam which are reflected from said bar code move;
said circuit includes a shutter positioned to block the passage of light from said mechanism along said optical path, which otherwise would be detected by said mechanism;
said circuit being constructed to open only when all of said contact switches are actuated.

8. A method for operating a bar code scanner apparatus to provide an indication of the light-reflecting contrast of the bar code elements of a bar code that is printed on the surface of a sheet or the like, where said scanner apparatus includes a hand-held scanner with a head that projects a scanning beam along an optical path at said bar code so some reflected light can pass along a reflection path, and which detects light reflected from said bar code along said reflection path, and said scanning apparatus includes a display which displays a quantity indicating the contrast of said bar code elements, comprising:
mounting said scanner in a holder that has a lower end for resting flat against said surface of said sheet;
placing said lower end against said surface of said sheet and detecting the substantial contact of each of a plurality of locations spaced about said lower end, and only upon detecting substantial contact at each of said locations, operating said scanning apparatus to display said quantity.

9. The method described in claim 8 wherein:
said step of operating said scanning apparatus includes blocking the passage of light along said optical path except upon detection of substantial contact at each of said locations.

\* \* \* \* \*